(12) United States Patent
Domenicali et al.

(10) Patent No.: US 6,823,958 B2
(45) Date of Patent: Nov. 30, 2004

(54) PROGRESSIVE SUSPENSION DEVICE FOR THE REAR WHEEL OF A MOTORCYCLE

(75) Inventors: Claudio Domenicali, Bologna (IT); Pierre Terblanche, Bologna (IT)

(73) Assignee: Ducati Motor Holding S.p.A., Bologna (IT)

(*) Notice: Subject to any disclaimer, the term of this patent is extended or adjusted under 35 U.S.C. 154(b) by 0 days.

(21) Appl. No.: 10/401,204

(22) Filed: Mar. 27, 2003

(65) Prior Publication Data

US 2003/0217881 A1 Nov. 27, 2003

(30) Foreign Application Priority Data

May 24, 2002 (EP) .............................. 02425332

(51) Int. Cl.[7] .................................................. B62M 7/00
(52) U.S. Cl. .......................................... 180/227; 280/285
(58) Field of Search ................................ 180/227, 219; 280/284, 285, 286, 288, 275

(56) References Cited

U.S. PATENT DOCUMENTS

| | | | |
|---|---|---|---|
| 1,047,430 A | | 12/1912 | Michaelson |
| 4,076,271 A | | 2/1978 | Doncque |
| 4,457,393 A | | 7/1984 | Tamaki et al. |
| 4,556,119 A | * | 12/1985 | Shiratsuchi ............... 180/219 |
| 4,706,774 A | * | 11/1987 | Tsuboi ...................... 180/227 |
| 4,712,638 A | * | 12/1987 | Kawaguchi et al. ...... 180/219 |
| 4,724,920 A | | 2/1988 | Tsuchida et al. |
| 5,062,495 A | * | 11/1991 | Padgett ..................... 180/227 |
| 6,253,868 B1 | * | 7/2001 | Horii et al. ............... 180/227 |
| 6,481,523 B1 | * | 11/2002 | Noro et al. ............... 180/227 |
| 6,581,711 B1 | * | 6/2003 | Tuluie ....................... 180/227 |
| 6,595,310 B2 | * | 7/2003 | Gogo ......................... 180/219 |

OTHER PUBLICATIONS

International Search Reporting corresponding to European Application No. EP 02 42 5332.

* cited by examiner

Primary Examiner—Lesley D. Morris
Assistant Examiner—Tony Winner
(74) Attorney, Agent, or Firm—Fay, Sharpe, Fagan, Minnich & McKee, LLP

(57) ABSTRACT

A progressive suspension device (1) for the rear wheel of a motorcycle, includes a swinging fork (2) that has a central section (10) to which one or two arms (8, 9) carrying a wheel (7) are connected. The suspension device further comprises a spring-damper assembly (14) connected at one end to a support (13) for the central section (10) of the fork (2), a rocker or lever (15) having a first end (16), with axis (16a), pivoted in seats (17) made in the engine crankcase (12) or in the motorcycle frame, the lever (15) also having a second end (18), with axis (18a), connected to the spring-damper assembly (14), A connecting rod (19) of adjustable length (C) joins the fork (2) to the lever (15). The connecting rod (19) comprises a first end (20) pivoted at an intermediate mounting point (21) between the first end (16) and the second (18) of the lever (15), and a second end (22) pivoted in a seat (23) made in the central section (10) of the fork (2). At the lever (15), between the mounting point (21) where the connecting rod (19) is pivoted and the axis (18a) of the second end (18), there is an angle (α) that may be varied to adapt the suspension device (1) to different progressive suspension needs.

15 Claims, 3 Drawing Sheets

PROGRESSIVE SUSPENSION DEVICE FOR THE REAR WHEEL OF A MOTORCYCLE

BACKGROUND OF THE INVENTION

The present invention relates to a progressive suspension device for the rear wheel of a motorcycle. The progressive, rear-wheel suspension device according to the present invention comprises a swinging fork for a wheel acting on a single damping spring assembly through at least one connecting rod and one rocker.

Rear-wheel suspension devices of this type are known, for example, from U.S. Pat. No. 4,076,271.

The U.S. patent describes a vehicle wheel suspension device for the rear wheel of a motorcycle. In one embodiment of it, this prior art suspension device comprises a fork for a rear wheel and two rods connected at the end of the fork close to the wheel in such a way as to transfer the force applied by the wheel on the fork to a single spring and damper through an intermediate swing element. The rods transmit only axial type forces and are arranged in such a way as to form the edges of a pyramid with downward pointing apex. In another embodiment of the invention, the fork has a reticulate structure whose elements are subjected mainly to normal forces.

Although the suspension device of the patent just described discloses solutions, such as the single spring and dampers, which make it possible to reduce overall dimensions, it is difficult to construct because it is based on unsubstantial components which, if they are to be subjected to only axial forces, must be constructed with extremely high dimensional and assembly precision. Further, the suspension device is difficult to adjust in terms of the ratio of force to wheel movement and is also unsuitable for a suspension device consisting of a fork with a single swing arm.

The present invention has for one of its objects to provide an improved progressive suspension device for the rear wheel of a motorcycle that may be applied to forks with either one or two arms, that may be easily adjusted in terms of the ratio of force to wheel movement, and that is easy to adapt to the constructional tolerances of the motorcycle to which it has to be fitted.

Another object of the present invention is to provide a rear-wheel suspension device that is economical, compact and occupies parts of the motorcycle that are not normally used.

SUMMARY OF THE INVENTION

In accordance with one aspect of it, the present invention discloses a progressive suspension device for the rear wheel of a motorcycle as described in the independent claim below. The dependent claims describe preferred, advantageous embodiments of the invention.

BRIEF DESCRIPTION OF THE DRAWINGS

The preferred embodiments of the invention will now be described, without restricting the scope of the inventive concept, with reference to the accompanying drawings in which.

DESCRIPTION OF THE PREFERRED EMBODIMENTS

Figure 1:
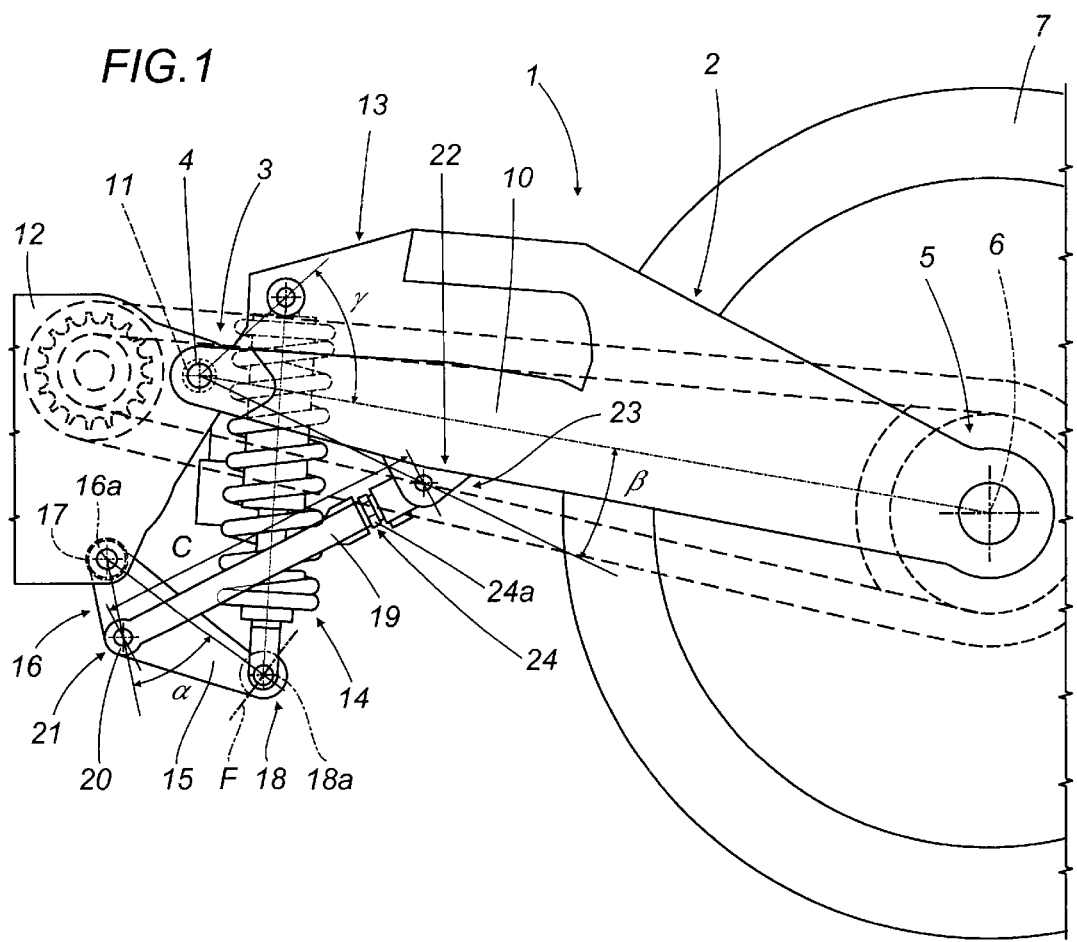
FIG. 1 is a side view of the progressive rear-wheel suspension device according to the present invention.
Figure 2:
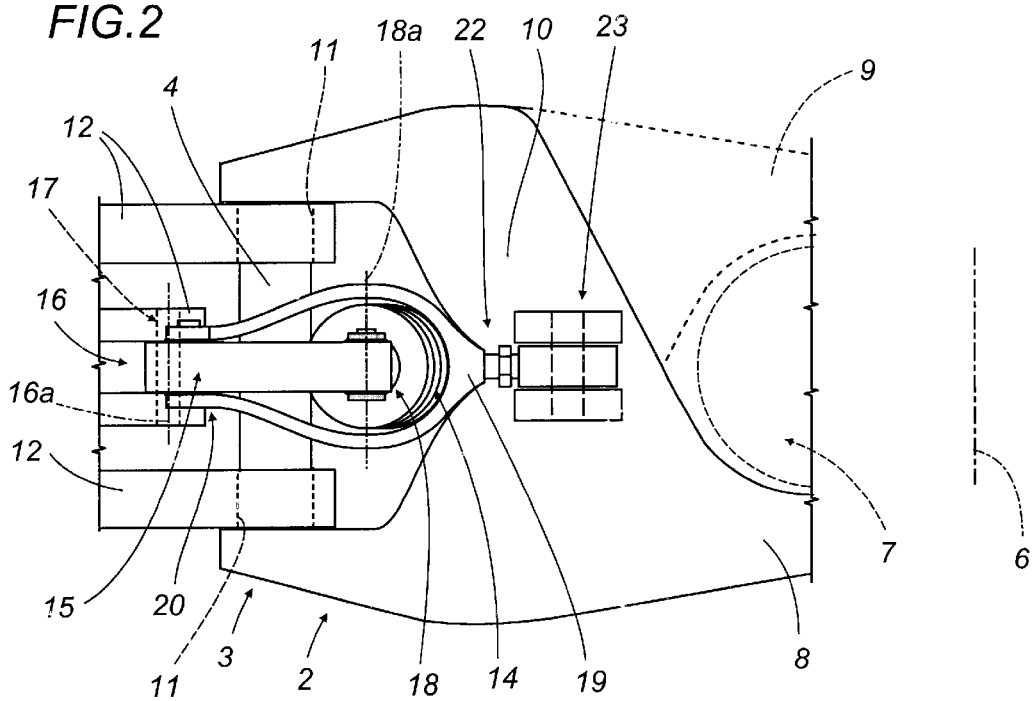
FIG. 2 is a view from below, with some parts cut away and others in cross section, of the progressive rear-wheel suspension device shown in FIG. 1.

With reference to the accompanying drawings, the numeral 1 denotes a progressive suspension device for the rear wheel of a motorcycle.

The suspension device 1 comprises a swinging fork 2 having a first end 3 pivoted at a pin 4 and a second end 5 that carries an axle 6 of a wheel 7.

The swinging fork 2 may comprise one or two arms 8, 9 connected at a central section 10.

Preferably, the pin 4 of the fork 2 is rotatably fitted inside seats 11 made in the engine crankcase 12, although the pin 4 may also be fitted in similar seats 11 in the motorcycle frame without thereby departing from the scope of the inventive concept of the present invention.

The central section 10 of the swinging fork 2 presents a support 13 for mounting a spring-damper assembly 14.

The suspension device 1 comprises a rocker or lever 15 pivoted at a first end 16, with axis 16a, in seats 17 made in the engine crankcase 12 or in the motorcycle frame.

The lever 15 presents a second end 18, with axis 18a, connected to the spring-damper assembly 14.

The suspension device 1 further comprises a connecting rod 19 joining the fork 2 to the lever 15.

The connecting rod 19 comprises a first end 20 pivoted at an intermediate mounting point 21 between the first end 16 and the second end 18 of the lever 15, and a second end 22 pivoted in a seat 23 made in the central section 10 of the fork 2. The connecting rod 19 is divided into two parts to enable the spring-damper assembly 14 to pass through the connecting rod 19 and, at its second end 22, comprises means 24 for adjusting the length C of the connecting rod 19 itself. The means 24 may consist of a lead nut and screw mechanism with a lock nut 24a, but other devices might also be used: for example, a rod with a series transversal holes in it and a pin that can be selectively inserted into one of the holes.

Figure 3:
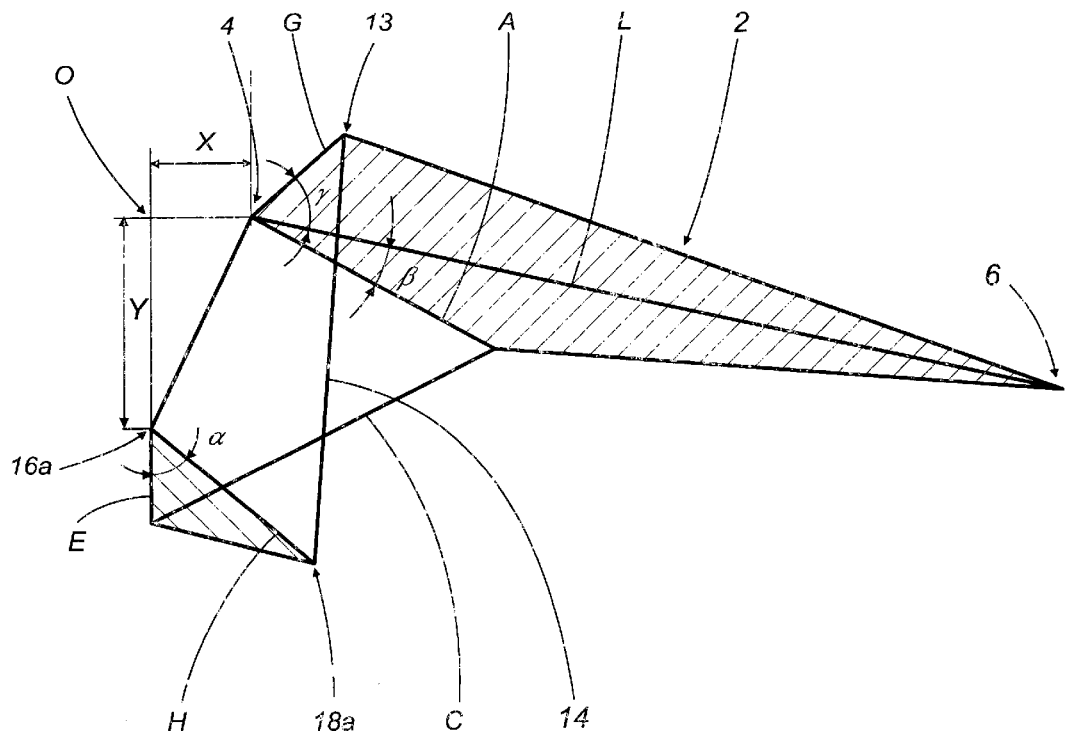
FIG. 3 is a schematic side view of the progressive rear-wheel suspension device illustrated in the figures listed above.

An important geometrical parameter of the suspension device 1 is the angle of the lever 15, labeled α in FIGS. 1 and 3.

This angle is made by the line passing through the axes 16a and 18a of the ends 16, 18 of the lever 15 with the line passing through the axis 16a and the axis of the mounting point 21 at which the connecting rod 19 is pivoted.

As shown in the examples below, variations in the angle α of the lever 15, and hence in the length C of the connecting rod 19—and to a lesser extent also in the other parameters—have a marked effect on the operating progression of the suspension.

The angle α of the lever 15 may have values ranging from −20 to 80 degrees. With negative angle values, a highly compact structure can be obtained, with, in particular, a connecting rod 19 of reduced length.

Preferably, as a compromise between compactness and stress on the components, the angle a ranges from 20 to 70 degrees.

The operation of the suspension device will now be described.

When the wheel 7 is displaced relative to the motorcycle engine or frame, the fork 2 swings about its pin 4 and thus causes a mainly axial movement of the connecting rod 19.

The latter, which is in turn connected to the lever 15 at the pivoted mounting point 21, causes the lever 15 to rotate about the axis 16a.

This has the effect of pushing the second end 18 of the lever 15 in such a way that it describes an arc F and causes the lower end of the spring-damper assembly 14 to also move.

The other end of the spring-damper assembly 14 is mounted in such a way that it can swing slightly on the support 13 of the fork 2. Thanks to this structure, the spring-damper assembly 14 is compressed or released according to the movements of the wheel 7 in a progressive or linear fashion. The performance of the structure can be significantly changed just by slightly modifying the geometrical characteristics of the lever 15 and adjusting the length C of the connecting rod 19 accordingly.

Different embodiments of the suspension device 1 will now be described with reference to the following examples and with the aid of the schematic representation of it in FIG. 3.

Considering a virtual origin O, the dimensions X and Y define the position of the fork 2 pin 4 and the position of the axis 16a of the lever 15.

Other important geometrical elements defined in FIG. 3 are:

- the angle α of the lever 15, defined above;
- the fork-connecting rod angle, labeled β, made by the line passing through the axis of the pin 4 and the axle 6 of the wheel 7 with the line passing through axis of the pin 4 and the axis of the connecting rod 19 seat 23; depending on the required dimensions and progressive suspension needs, the angle β ranges from 0 to 40 degrees;
- the fork-damper angle, labeled γ, made by the line passing through the axis of the pin 4 and the axle 6 of the wheel 7 with the line passing through axis of the pin 4 and the axis of the pivot point of the spring-damper assembly 14; depending on the required dimensions and progressive suspension needs, the angle γ ranges from 0 to 70 degrees;
- the length of the fork 2, labeled L, defined as the distance between the axis of the pin 4 and the axle 6 of the wheel 7;
- the fork-connecting rod length, labeled A, defined as the distance between the axis of the pin 4 and the axis of the connecting rod 19 seat 23;
- the length of the connecting rod 19, labeled C, defined as the distance between the axes of pivot points of the connecting rod 19 ends 20 and 22;
- the fork pin-damper pivot point length, labeled G, defined as the distance between the axis of the pin 4 and the axis of the pivot point of the spring-damper assembly 14;
- the lengths of the lever 15, labeled E and H, defined, respectively, as the distance between the axis 16a of the lever 15 and the axis of the mounting point 21 at which the connecting rod 19 is pivoted, and the distance between the axes 16a and 18a of the lever 15.

Figure 4:
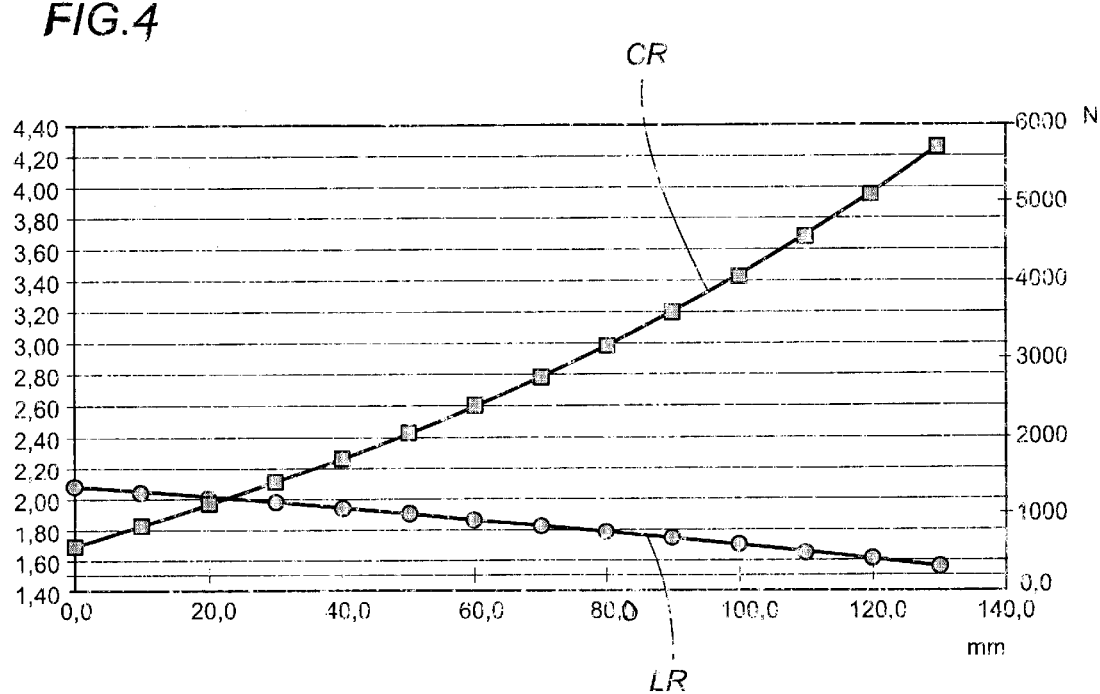
FIGS. 4 to 6 are diagrams relating to the progressive rear-wheel suspension device illustrated in the figures listed above.
Figure 5:
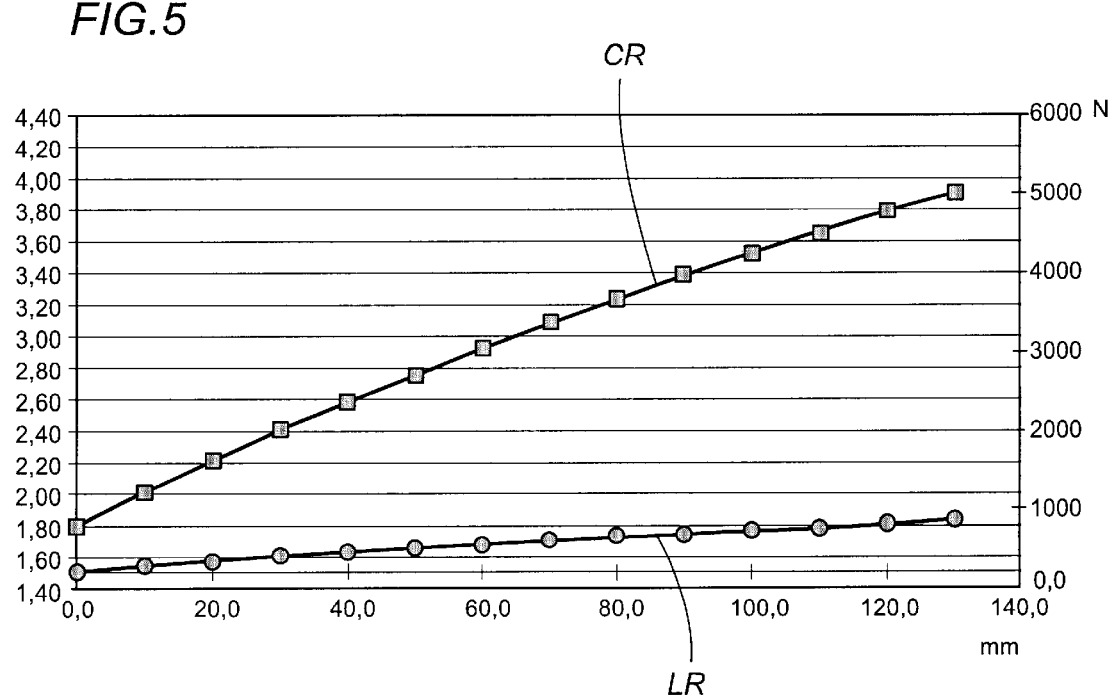
Figure 6:
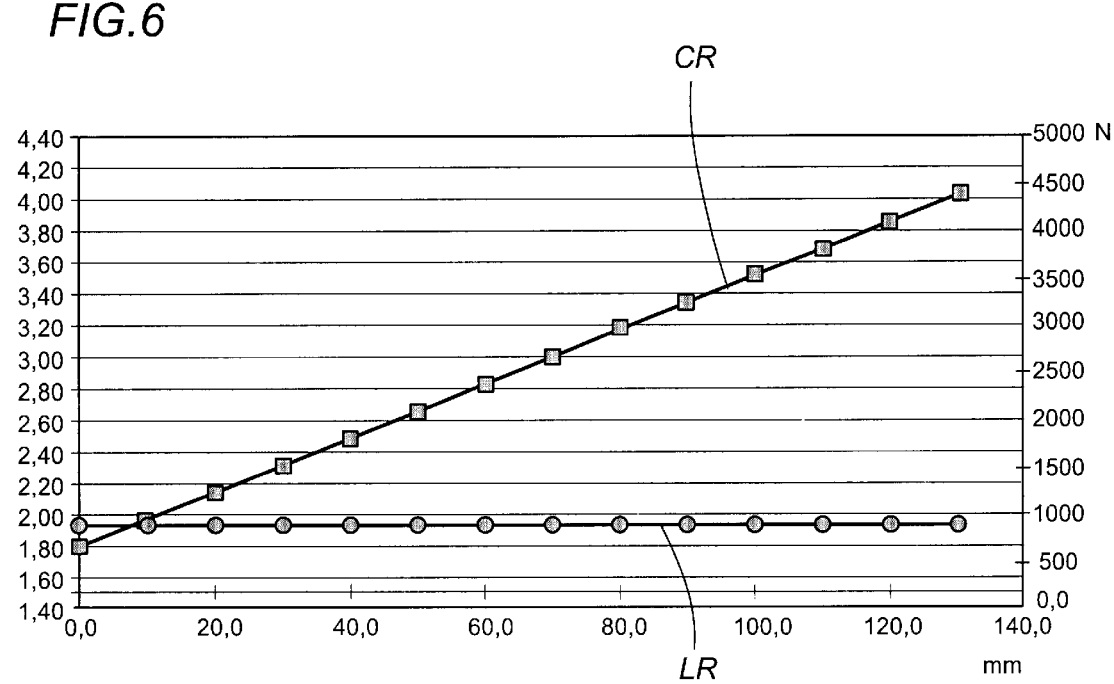

FIGS. 4 to 6 show three diagrams relating to three different embodiments. The x-axis represents the stroke in millimeters of the axle 6 of the wheel 7. The y-axis on the left represents the non-dimensional value of the ratio of the variation in the stroke of the axle 6 of the wheel 7 to the variation in the stroke of the spring-damper assembly 14. The y-axis on the right represents the load in Newton (N) axle 6 of the wheel 7. The curves labeled CR represent the load on the axle 6 of the wheel 7, while the curves labeled LR represent the ratio of the variation in the wheel stroke to the variation in the stroke of the assembly 14. This ratio is also known as lever ratio.

The characteristics of the spring-damper assembly 14, the same in all the embodiments, are the following:

| | | |
|---|---|---|
| maximum length | mm | 305.0 |
| elastic constant of spring | N/mm | 104 |
| preload | mm | 9 |
| gas pressure | bar | 12.0 |
| gas force | N | 246 |
| total stroke | mm | 74.0 |
| free stroke | mm | 60.0 |

The geometrical characteristics of the suspension device 1 in the embodiment represented by FIG. 4 are shown in the table below:

| | | |
|---|---|---|
| L | [mm] | 550.0 |
| β | [degrees] | 20.00 |
| A | [mm] | 180.00 |
| γ | [degrees] | 50.0 |
| G | [mm] | 100.0 |
| X | [mm] | −70.000 |
| Y | [mm] | −150.000 |
| C | [mm] | 269.0 |
| E | [mm] | 60.0 |
| H | [mm] | 150.0 |
| α | [degrees] | 70.0 |

The results for the suspension device 1 in the embodiment represented by FIG. 4 are shown in the table below:

| Wheel axle 6 stroke [mm] | Ass.y 14 stroke [mm] | Lever-ratio non-dimensional | Ass.y 14 load [N] | Wheel 7 load [N] | Relative wheel 7 load [N/mm] | Progression non-dimensional |
|---|---|---|---|---|---|---|
| 0.0 | 0.0 | 1.51 | 1200 | 797 | 46.7 | 0.0% |
| 10.0 | 6.6 | 1.54 | 1895 | 1229 | 44.6 | −2.4% |
| 20.0 | 13.0 | 1.58 | 2576 | 1635 | 42.7 | −4.6% |
| 30.0 | 19.3 | 1.61 | 3242 | 2017 | 41.0 | −6.7% |
| 40.0 | 25.4 | 1.64 | 3895 | 2380 | 39.6 | −8.7% |
| 50.0 | 31.5 | 1.66 | 4538 | 2726 | 38.3 | −10.5% |
| 60.0 | 37.4 | 1.69 | 5169 | 3057 | 37.1 | −12.3% |
| 70.0 | 43.3 | 1.72 | 5791 | 3374 | 36.0 | −14.0% |
| 80.0 | 49.1 | 1.74 | 6405 | 3678 | 35.0 | −15.6% |
| 90.0 | 54.8 | 1.76 | 7009 | 3971 | 34.0 | −17.2% |
| 100.0 | 60.4 | 1.79 | 7606 | 4254 | 33.2 | −18.7% |
| 110.0 | 66.0 | 1.81 | 8195 | 4527 | 32.3 | −20.2% |
| 120.0 | 71.5 | 1.83 | 8777 | 4790 | 31.6 | −21.7% |
| 130.0 | 76.9 | 1.85 | 9352 | 5044 | 30.8 | −23.1% |

It will be noticed in this embodiment that increasing the wheel axle stroke reduces the load needed to move the wheel (relative wheel load). This feature is also evidenced in the <<Progression>> column, where all the values are negative, indicating this reduction in percentage terms.

In the second embodiment, the modified geometrical characteristics of the suspension device 1 are α=20.0 degrees and C=221.1 mm.

The results for the suspension device 1 in the embodiment represented by FIG. 5 are shown in the table below:

| Wheel axle 6 stroke [mm] | Ass.y 14 stroke [mm] | Lever-ratio non-dimen-sional | Ass.y 14 load [N] | Wheel 7 load [N] | Relative wheel 7 load [N/mm] | Progression non-dimensional |
|---|---|---|---|---|---|---|
| 0.0 | 0.0 | 2.07 | 1200 | 578 | 24.6 | 0.0% |
| 10.0 | 4.9 | 2.04 | 1710 | 841 | 25.5 | 1.7% |
| 20.0 | 9.8 | 2.01 | 2239 | 1117 | 26.4 | 3.3% |
| 30.0 | 14.8 | 1.97 | 2772 | 1407 | 27.3 | 5.0% |
| 40.0 | 20.0 | 1.93 | 3315 | 1715 | 28.3 | 6.8% |
| 50.0 | 25.2 | 1.90 | 3869 | 2040 | 29.5 | 8.6% |
| 60.0 | 30.5 | 1.86 | 4433 | 2386 | 30.7 | 10.4% |
| 70.0 | 35.9 | 1.82 | 5010 | 2755 | 32.1 | 12.3% |
| 80.0 | 41.5 | 1.78 | 5599 | 3150 | 33.6 | 14.3% |
| 90.0 | 47.2 | 1.73 | 6203 | 3576 | 35.2 | 16.4% |
| 100.0 | 53.0 | 1.69 | 6822 | 4037 | 37.1 | 18.5% |
| 110.0 | 59.0 | 1.64 | 7458 | 4539 | 39.3 | 20.8% |
| 120.0 | 65.2 | 1.59 | 8113 | 5091 | 41.7 | 23.2% |
| 130.0 | 71.6 | 1.54 | 8789 | 5702 | 44.6 | 25.7% |

In this embodiment, increasing the wheel axle stroke increases the load needed to move the wheel (relative wheel load). This feature is also evidenced in the <<Progression>> column, where all the values are positive, indicating this increase in percentage terms. It should also be noticed that these values show a more marked increase for the last part of the wheel stroke.

In the third embodiment, the modified geometrical characteristics of the suspension device 1 are α=46.1 degrees and C=247.9 mm.

Lastly, the results for the suspension device 1 in the embodiment represented by FIG. 6 are shown in the table below:

| Wheel axle 6 stroke [mm] | Ass.y 14 stroke [mm] | Lever-ratio non-dimen-sional | Ass.y 14 load [N] | Wheel 7 load [N] | Relative wheel 7 load [N/mm] | Progression non-dimensional |
|---|---|---|---|---|---|---|
| 0.0 | 0.0 | 1.92 | 1200 | 624 | 28.6 | 0.0% |
| 10.0 | 5.2 | 1.93 | 1750 | 908 | 28.5 | −0.2% |
| 20.0 | 10.4 | 1.93 | 2300 | 1192 | 28.5 | −0.3% |
| 30.0 | 15.6 | 1.93 | 2849 | 1475 | 28.4 | −0.4% |
| 40.0 | 20.7 | 1.93 | 3398 | 1758 | 28.4 | −0.5% |
| 50.0 | 25.9 | 1.93 | 3946 | 2042 | 28.4 | −0.5% |
| 60.0 | 31.1 | 1.93 | 4495 | 2326 | 28.4 | −0.4% |
| 70.0 | 36.3 | 1.93 | 5043 | 2611 | 28.4 | −0.4% |
| 80.0 | 41.4 | 1.93 | 5592 | 2898 | 28.5 | −0.3% |
| 90.0 | 46.6 | 1.93 | 6142 | 3187 | 28.5 | −0.2% |
| 100.0 | 51.8 | 1.92 | 6693 | 3479 | 28.6 | 0.0% |
| 110.0 | 57.0 | 1.92 | 7244 | 3773 | 28.8 | 0.2% |
| 120.0 | 62.2 | 1.92 | 7797 | 4071 | 28.9 | 0.4% |
| 130.0 | 67.5 | 1.91 | 8351 | 4372 | 29.0 | 0.7% |

In this last case, the force needed to move the wheel (relative wheel load) remains substantially constant and the load-movement characteristics of the suspension device vary in practically linear fashion. This feature is also evidenced in the <<Progression>> column, where all the values are around zero percent.

As demonstrated in the embodiments described above, the suspension device 1 according to this invention can be easily adapted to suit a wide variety of progressive suspension needs. By making minor constructional changes to the geometry of the lever 15, it is possible to obtain large variations in the operation of the suspension device.

Since all the geometrical changes required are concentrated in the lever 15 and, to a lesser extent, in the connecting rod 19, it is very easy to substitute these parts and to adapt them to different suspension needs.

Other important advantages of the progressive suspension device for the rear wheel of a motorcycle according to the present invention are the following:

The entire suspension device 1 requires only two points of connection to the motorcycle frame or engine. In particular, the spring-damper assembly 14 is supported entirely by the suspension device itself and does not require reaction points on the frame or engine to absorb stresses. This makes it very easy to mount and remove the suspension device and to position it on the motorcycle frame.

More specifically, the suspension device 1 can be easily fitted and removed by simply using the two pins attaching the fork 2 and the lever 15. This facilitates maintenance because it means the entire rear section of the motorcycle can be separated.

When the suspension device 1 is supported directly by the engine crankcase, the motorcycle frame structure is further simplified since it does not require the mounting points for the suspension device. Suspension driving precision is also greatly enhanced because the mounting points directly on the engine are much more rigid.

The suspension device 1 is extremely compact and occupies a part of the motorcycle that is normally not used.

The suspension device 1 according to the present invention can be applied to swinging forks with either one or two arms. In any case, the forces applied by the spring-damper assembly 14 are absorbed by the central section 10 of the swinging fork, thus allowing greater freedom in the configuration of the fork arms.

The heaviest parts of the suspension device 1 (the spring-damper assembly 14 and the connecting rod) are located at the bottom, thus lowering the center of gravity of the motorcycle. Also, they are close to the suspension's center of oscillation (the axis of the pin 4), thus reducing the inertia with which the suspension device 1 follows the bumps and hollows on the road the motorcycle is traveling on.

The invention as described above may be modified and adapted in several ways without thereby departing from the scope of the inventive concept as defined in the claims.

List of Reference Characters
1 suspension device
2 swing fork
3 first end of fork 2
4 pin of fork 2
5 second end of fork 2
6 wheel axle
7 wheel
8 first arm of swing fork 2
9 second arm of fork 2
10 central section of fork 2
11 seats for pin 4
12 engine crankcase
13 support for spring-damper assembly
14 spring-damper assembly
15 lever
16 first end of lever 15
16a axis of first end of lever 15
17 seats for first end 16
18 second end of lever 15
18a axis of second end of lever 15
19 connecting rod
20 first end of connecting rod 19

21 intermediate pivoted mounting point of lever 15
22 second end of connecting rod 19
23 seats for second end 22 of connecting rod 19
24 adjustment means
24a lock nut

What is claimed is:

1. A progressive suspension device (1) for the rear wheel of a motorcycle, comprising:

a swinging fork (2) having a first end (3) pivoted at a pin (4) fitted inside at least one first seat (11) made in either an engine crankcase (12) or a motorcycle frame, and a second end (5) that carries an axle (6) of a wheel (7), the fork (2) having a central section (10), provided with a second seat (23) and to which there is connected at least one arm (8, 9) to support the wheel (7);

a spring-damper assembly (14) connected at a first end to a support (13) for the central section (10) of the fork (2);

a lever (15) having a first end (16), provided with a pivoting axis (16a), the lever (15) being pivotable at the pivoting axis (16a) in at least one third seat (17) made in either the engine crankcase (12) or the motorcycle frame, the lever (15) also having a second end (18), provided with a connecting axis (18a), the lever (15) being operatively connected at the connecting axis (18a) to a second end of the spring-damper assembly (14);

a connecting rod (19), of length (C), joining the fork (2) to the lever (15), said connecting rod (19) having a first end (20) operatively connected to the lever (15) at an intermediate point (21) between the first end (16) and the second end (18) of the lever (15), and a second end (22) operatively connected to the second seat (23), said connecting rod (19) comprising means (24) for adjusting a length (C) of said connecting rod (19).

2. The suspension device (1) according to claim 1, wherein the connecting rod (19) is divided into two parts to enable the passage of the spring-damper assembly (14).

3. The suspension device (1) according to claim 1, wherein said means (24) for adjusting the length (C) of the connecting rod (19) are located at the second end (22) of the connecting rod (19).

4. A progressive suspension device (1) for the rear wheel of a motorcycle, comprising:

a swinging fork (2) having a first end (3) pivoted at a pin (4) fitted inside at least one first seat (11) made in an engine crankcase (12) or a motorcycle frame, and a second end (5) that carries an axle (6) of a wheel (7), the fork (2) including a central section (10), provided with a second seat (23), and to which there is connected at least one arm (8, 9) to support the wheel (7);

a spring-damper assembly (14) connected at a first end to a support (13) for the central section (10) of the fork (2);

a lever (15) having a first end (16), provided with a pivoting axis (16a), the lever (15) being pivotable at the pivoting axis (16a) in at least one third seat (17) made in the engine crankcase (12) or the motorcycle frame, the lever (15) also having a second end (18), provided with a connecting axis (18a), the lever (15) being operatively connected at the connecting axis (18a) to a second end of the spring-damper assembly (14);

an adjustable length connecting rod (19) joining the fork (2) to the lever (15), said connecting rod (19) having a first end (20) operatively connected to the lever (15) at an intermediate point (21) between the first end (16) and the second end (18) of the lever (15), and a second end (22) operatively connected to the second seat (23), wherein the second end (18) of the lever (15) and the intermediate point (21) of the lever (15) are positioned according to an angle ($\alpha$) defined between a first line passing through the pivoting and connecting axes (16a, 18a) and a second line passing through the pivoting axis (16a) and the intermediate point (21).

5. The suspension device (1) according to claim 4, wherein the angle ($\alpha$) ranges from 20 to 70 degrees.

6. The suspension device (1) according to claim 4, wherein the connecting rod (19) is divided into two parts to enable the spring-damper assembly (14) to pass through the connecting rod (19).

7. A progressive suspension device (1) for the rear wheel of a motorcycle, comprising:

a swinging fork (2) having a first end (3) pivoted by a pin (4) to either an engine crankcase (12) or a motorcycle frame, and a second end (5) that carries an axle (6) of a wheel (7), the fork (2) including a central section (10) provided with a seat (23);

a spring-damper assembly (14) connected at a first end to a support (13) for the central section (10) of the fork (2);

a lever (15) having a first end (16) pivotally connected at a pivoting axis (16a) to either the engine crankcase (12) or the motorcycle frame, the lever (15) also having a second end (18) pivotally connected to a second end of the spring-damper assembly (14) at a connecting axis (18a);

an adjustable length connecting rod (19) joining the fork (2) to the lever (15), said connecting rod (19) having a first end (20) connected to the lever (15) at an intermediate point (21) between the first end (16) and the second end (18) of the lever (15), and a second end (22) connected to the seat (23) of the central section (10) of the fork (2);

the axle (6) of the wheel (7) and the seat (23) for the connecting rod (19) being positioned according to an angle ($\beta$) defined between a first line passing through an axis of the pin (4) and the axle (6) of the wheel (7) and a second line passing through the axis of the pin (4) and an axis of the seat (23).

8. The suspension device (1) according to claim 7, wherein the angle ($\beta$) ranges from 0 to 40 degrees.

9. A progressive suspension device (1) for the rear wheel of a motorcycle, comprising:

a swinging fork (2) having a first end (3) pivoted at a pin (4) fitted inside at least one first seat (11) of an engine (12) or a motorcycle frame, and a second end (5) that carries an axle (6) of a wheel (7), the fork (2) including a central section (10), provided with a second seat (23);

a spring-damper assembly (14) connected at a first end to a support (13) for the central section (10) of the fork (2) at a mounting point;

a lever (15) having a first end (16), provided with a pivoting axis (16a), the lever (15) being pivotable at the pivoting axis (16a) in at least one third seat (17) of the engine (12) or the motorcycle frame, the lever (15) also having a second end (18), provided with a connecting axis (18a), the lever (15) being associated at the connecting axis (18a) to a second end of the spring-damper assembly (14);

a connecting rod (19), of adjustable length (C), joining the fork (2) to the lever (15), said connecting rod (19) having a first end (20) associated to the lever (15) at an intermediate point (21) between the first end (16) and the second end (18) of the lever (15), and a second end (22) associated to the second seat (23);

the axle (6) of the wheel (7) and the mounting point of the spring-damper assembly (14) being positioned according to an angle (γ) defined between a first line passing through an axis of the pin (4) and the axle (6) of the wheel (7) and a second line passing through the axis of the pin (4) and an axis of the mounting point of the spring-damper assembly (14).

10. The suspension device (1) according to claim 9, wherein the angle (γ) ranges from 0 to 70 degrees.

11. A progressive suspension device (1) for the rear wheel of a motorcycle, comprising:

a swinging fork (2) having a first end (3) pivoted at a pin (4) fitted inside at least one first seat (11) of an engine crankcase (12) or motorcycle frame, and a second end (5) that carries an axle (6) of a wheel (7), the fork (2) including a central section (10), provided with a second seat (23);

a spring-damper assembly (14) connected at a first end to a support (13) for the central section (10) of the fork (2) at a mounting point;

a lever (15) having a first end (16) pivotally connected about a pivoting axis (16a) to at least one third seat (17) of the engine crankcase (12) or the motorcycle frame, the lever (15) also having a second end (18) pivotally connected at a connecting axis (18a) to a second end of the spring-damper assembly (14);

a connecting rod (19), of adjustable length (C), joining the fork (2) to the lever (15), said connecting rod (19) having a first end (20) associated to the lever (15) at an intermediate point (21) between the first end (16) and the second end (18) of the lever (15), and a second end (22) associated to the second seat (23);

wherein the second end (18) of the lever (15) and the intermediate point (21) of the lever (15) are positioned according to an angle (α) defined between a first line passing through the pivoting and connecting axes (16a, 18a) and a second line passing through the pivoting axis (16a) and the intermediate point (21) at which the connecting rod (19) is connected to the lever (15);

wherein the axle (6) of the wheel (7) and the second seat (23) for the connecting rod (19) are positioned according to an angle (β) defined between a third line passing through an axis of the pin (4) and the axle (6) of the wheel (7) and a fourth line passing through the axis of the pin (4) and an axis of the second seat (23); and wherein the axle (6) of the wheel (7) and the mounting point of the spring-damper assembly (14) are positioned according to an angle (γ) defined between the third line and a fifth line passing through the axis of the pin (4) and an axis of the mounting point of the spring-damper assembly (14).

12. The suspension device (1) according to claim 11, wherein the angle (α) ranges from 20 to 70 degrees.

13. The suspension device (1) according to claim 11, wherein the angle (β) ranges from 0 to 40 degrees.

14. The suspension device (1) according to claim 11, wherein the angle (γ) ranges from 0 to 70 degrees.

15. The suspension device (1) according to claim 11, wherein the connecting rod (19) is divided into two parts to enable the passage of the spring-damper assembly (14).

* * * * *